Figure 1:
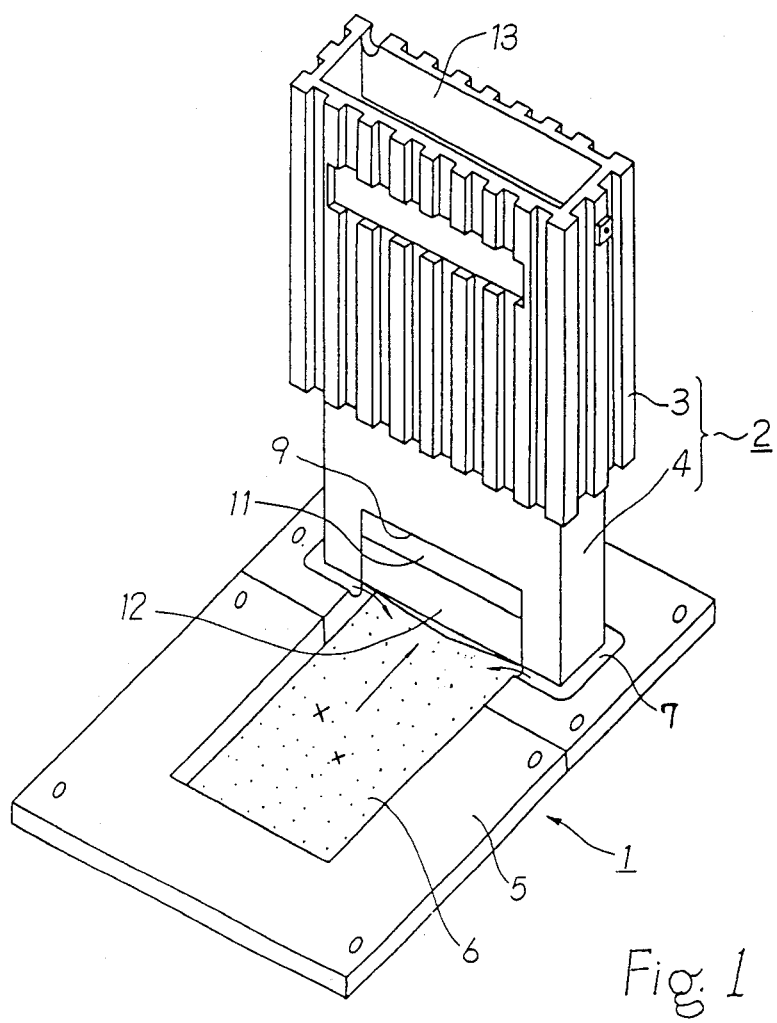

United States Patent [19]

Ponce et al.

[11] Patent Number: 4,502,413
[45] Date of Patent: Mar. 5, 1985

[54] SANITARY DEVICE FOR DISPOSAL OF EXCRETORY MATTER OF ANIMALS SUCH AS DOGS

[76] Inventors: Max Ponce, 40 Bis Ave. Anatole, 63130 Royat; Gerard Dumarcher, Quartier la Peyreras 84500, Bollene, both of France

[21] Appl. No.: 512,782

[22] Filed: Jul. 11, 1983

[51] Int. Cl.³ .............................................. A01K 29/00
[52] U.S. Cl. ....................................................... 119/1
[58] Field of Search ............................ 119/1, 29, 19, 17; 4/227, 363, 364; 198/495, 814

[56] References Cited

U.S. PATENT DOCUMENTS

| | | | |
|---|---|---|---|
| 1,461,673 | 7/1923 | Papin | 4/363 |
| 2,021,110 | 11/1935 | Strattman | 4/227 |
| 2,359,464 | 10/1944 | Carothers et al. | 198/814 |
| 3,318,285 | 5/1967 | Betham | 119/1 |
| 3,793,988 | 2/1974 | Traeger | 119/1 |
| 3,815,728 | 6/1974 | Vaughan | 198/495 |
| 4,050,414 | 9/1977 | Knochel et al. | 119/1 |
| 4,098,229 | 7/1978 | Haynes et al. | 119/1 |
| 4,174,589 | 11/1979 | Daharsh | 47/79 |
| 4,242,763 | 1/1981 | Walker | 119/1 |

Primary Examiner—Robert Peshock
Assistant Examiner—Kris R. Schulze
Attorney, Agent, or Firm—Lee C. Robinson, Jr.; Curtis, Morris & Safford

[57] ABSTRACT

A sanitary device for receiving natural excretory wastes from dogs or similar animals, and automatically disposing of such wastes, includes a rolling carpet on which the animal can deposit the waste matter, a platform surrounding an upper part of the carpet, and a column rising from the platform and containing the drive mechanism for rotating the carpet after the animal has deposited the waste matter, a water trough for receiving water, and a flush mechanism for supplying the water to wash the waste matter from the carpet and also to rinse the sides of the column. The column is formed of upper and lower parts, with the upper part being a cornice for the lower part. A sluicing channel at the juncture of the upper and lower parts rinses down the vertical surfaces of the lower column part, and a channel in the platform at the foot of the column channels the rinse, plus any entrained urine, towards an evacuation orifice. A flower trough is favorably provided atop the column, as vegetation is conductive to the natural functions of dogs and similar animals.

15 Claims, 2 Drawing Figures

SANITARY DEVICE FOR DISPOSAL OF EXCRETORY MATTER OF ANIMALS SUCH AS DOGS

The present invention relates both to the domain of animal raising and the management of public places with a view to maintaining their cleanliness and sanitation; more particularly, the invention is directed to a device for sanitary disposal of fecal matter of such domestic animals as dogs.

The combined effect of growing urbanization and the love of the public for dogs has led to a problem of hygiene in the urban environment, namely that arising from the defecation of these animals in public places. An island of refuge, that is, a device for dealing with canine fecal matter (sometimes called an animal comfort station) is described, in a very general manner, in French Pat. No. 2,460,612.

The present invention has as its object the improved construction and operation of such an island of refuge, taking into consideration certain imperatives connected with the instincts and mode of living of the animals on the one hand, and the establishment of such islands in urban areas on the other.

According to the present invention, a device of necessity for such animals as dogs, of the type consisting of a rolling carpet on which the animal is led when it needs to urinate and/or defecate, and means for cleaning the carpet incorporated in a platform placed generally at ground level and including also a vertical column containing means for rotating the carpet, has general characteristics of two categories: a first category relating to the external organization and with the fixed parts of the device, and a second category relating to the inner organization of the device and with its moving parts.

In accordance with the characteristics of the first category, a device of the invention generally comprises a large border surrounding the carpet and the column, the large border having a collector channel around the foot of the column; the column itself has an upper and a lower part with smooth walls, the upper part forming a peripheral cornice or protuberance extending all around and above the lower part of the column, a sluicing slope of the smooth walls being set under the cornice with the upper part designed for containing means for feeding in water and treatment of the latter, the lower part designed for containing the means for moving the carpet.

Preferably, the means for feeding in water consist of a faucet with a valve connected to a water supply and controlled by a float arrangement, a primary overflow trough for receiving the water from the faucet, a tank for receiving the overflow water, the float remaining at the level of the water in the tank, and a pump for rapidly removing the water from the tank to direct it to various portions of the device.

More particularly, the column is made up of two containers each generally in the form of a parallelepiped, namely, an upper container constituting the upper part and a lower container constituting the lower part, the upper container being affixed onto the lower container and enclosed at its upper part by a flower trough provided with a capillary pipe passing through the flower trough and entering the primary overflow trough.

Also, more particularly, in a preferred embodiment the lower container has on its wall facing the carpet, an opening with two shutters, an upper and a lower shutter, respectively, the upper shutter being hinged on the container and the lower shutter being hinged on the upper shutter, the shutters opening inward to the container, the lower shutter being designed to be open during the rotation of the carpet while the upper shutter, normally closed, opens only to an abnormal thrust from the outside. An interlock control switch is disposed at the inner side of the upper shutter and is capable of halting the rolling of the carpet immediately when the upper shutter opens. This is a safety feature to protect animals and children from the operating mechanism.

The characteristics of the first category mentioned above yield at least these advantageous results: in the first place, it will be noted that while the carpet is meant to receive liquid as well as solid excrement, the column and more particularly, the lower part, will receive the liquid waste of male dogs, who instinctively require a vertical surface; for this reason means are provided to ensure that the lower part of the column is automatically rinsed down periodically (or as needed). It has been discovered, also, that the presence of vegetation is an attaction for the animals when they need to perform their excretory functions and for that reason the flower trough is provided at the upper part of the column. For the purpose of watering the trough vegetation in a more or less continuous fashion, a capillary pipe is provided dipping into the primary overflow trough. This feature provides a useful advantage in that the water carried by the pipe is free of the treatment products, which would not be the case if the pipe were submerged in the tank.

In accordance with the characteristics of the second category, the means for treating the water include a reservoir for a disinfecting agent and an arrangement for dosing the water in the tank with the disinfecting agent. This arrangement can be activated by a float lever when the latter moves from a low to a high position, the dosing arrangement having the function of putting a predetermined amount of the disinfecting agent into the reservoir and so injecting it into the tank.

The characteristics of the second category take into account the fact that in devices of the type cited above, the rolling carpet is constituted as an endless belt supported by at least two rollers, one of which serves as the driver. The means for moving the carpet comprises a gear reduction system, an angular transmission system including an output pulley shaft and a vertical input shaft perpendicular to the output shaft, the angular transmission system being placed underneath the reduction system, a generally vertical transmission shaft connecting the output shaft of the reduction system to the input shaft of the transmission, and a belt linking the output pulley of the reduction system to a pulley of the driver roller.

The carpet is preferably supported by four rollers supported by a chassis formed of two trapezoids coupled with braces. Roller axes are fitted into each of the four angles of the trapezoid; the carpet follows a path divided into four parts: one upper part inclined only slightly to the horizontal, a first oblique, descending part, a lower part inclined slightly to the horizontal, and a second oblique, rising part.

Also preferably, a cylindrical cleaning brush is disposed at the descending part of the carpet path, with a fixed scraper being arranged lengthwise, tangent to the brush, while a drying roller is placed on the rising part of the path, with a fixed scraper being set lengthwise, against this roller.

Advantageously, support plates can be fixed to the chassis and set inside the loop formed by the carpet, at each of the upper and oblique parts.

Also preferably, at least one of the rollers set in an angle of the larger base of the trapezoidal chassis for the carpet, is held in continuous tension by tension springs disposed in the direction along the length of this base to keep the carpet under constant tension.

Moreover, the assembly including the chassis, the rollers, the brush, and the carpet, and in addition, the auxiliary tension and cleaning devices, is preferably disposed within a case or housing in the form of a parallelepiped, the bottom of which slopes slightly from its periphery toward an evacuation orifice arranged to coincide generally with the column.

Finally, a water ejection system also includes a sprayer strip set under the cornice and a sprayer strip opposite the oblique descending part of the carpet, above the cleaning brush, with these sprayer strips being connected with the water outlet from the pump.

The characteristics of the second category, cited above, also produce advantageous results. Because the electrically operated motor and gear reduction system are situated above the angular transmission system and are linked to it by a shaft and not by a chain or belt, and because the angular transmission system is linked to the carpet by a belt, with the carpet being disposed underneath the transmission system and the transmission system itself being underneath the gear reduction group, the water present in the lower parts of the device is prevented from climbing toward the motor, which thus stays dry. Also, the assembly made up of the carpet, the support rollers, the brush, the drying roller, and their cleansing accessories, constitutes a single unit that can be removed with relative ease from the case after the removal of a part of the larger border surrounding the carpet to permit the replacement or cleansing of parts of this assembly.

The device also contains, incorporated into the column, instruments for controlling a cycle of operation in the following successive stages: sensing the presence of an animal on the carpet by ultrasonic means, sensing the departure of the animal, the simultaneous commencement of operation of the means for moving the carpet and starting the pump; then, after a certain pause in the action of these instruments, refilling the tank and releasing a dosage of the disinfecting agent until the tank is refilled; and finally, awaiting a subsequent cycle of operation.

Figure 2:
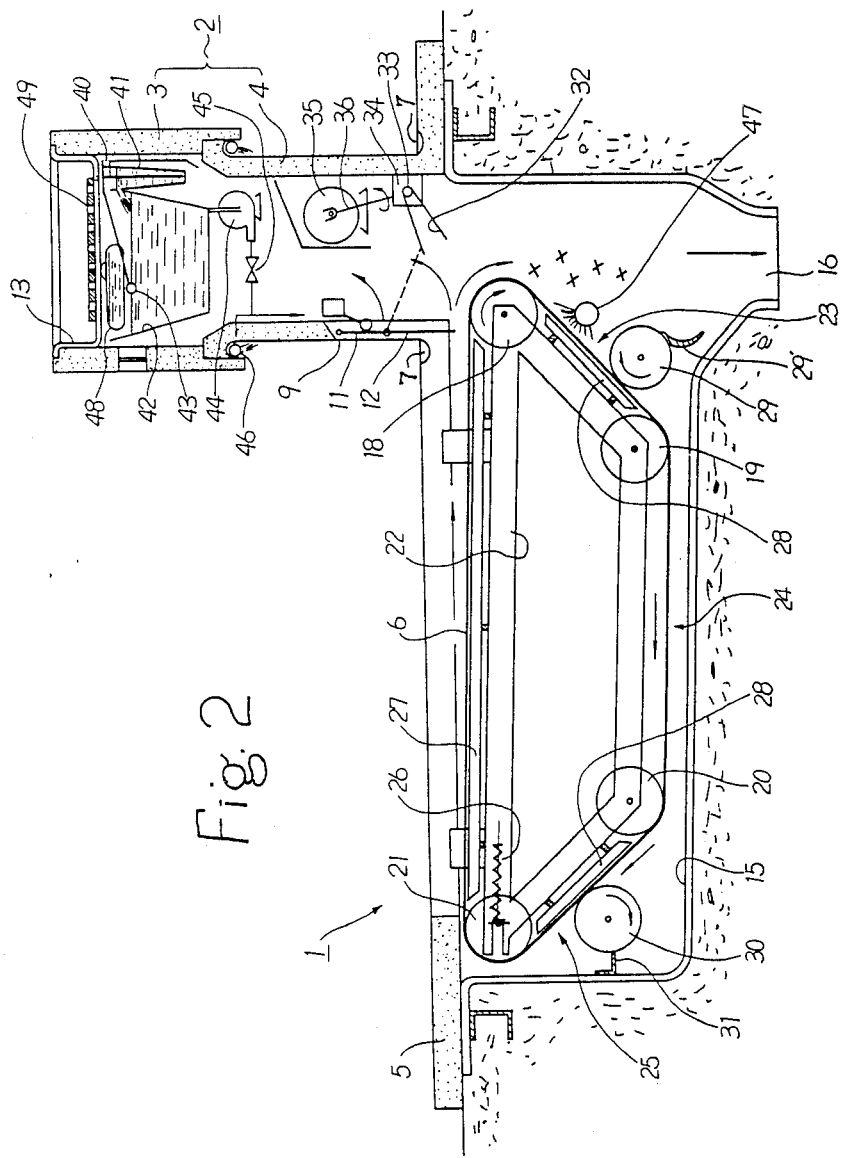

These and other objects, features, and advantages of the present invention will be better understood and some of the details relating to it will become evident from the description given below of a preferred embodiment, when considered in connection with the attached drawings in which:

FIG. 1 is an illustration in perspective of one embodiment of apparatus according to the present invention, and FIG. 2 is a schematic section on a larger scale for explaining the construction and the functions of the internal features of the embodiment of this invention.

With reference initially to FIG. 1, a comfort station for animals, constructed according one embodiment of this invention, is constructed of a platform 1 and a column 2; the platform 1 being generally formed of a large border 5 surrounding the base of the column with a central opening in which a carpet 6 of a synthetic grass is disposed. The border 5 is preferably constructed in two parts, one part surrounding the carpet, the other part surrounding the column. The part surrounding the column has, at the column's base, a channel 7. The column itself consists of a decorated upper part 3 and a smooth lower part 4. The upper part 3 forms a cornice that overhangs the lower part 4, the lower part having, opposite the carpet, an opening 9 closed by a double shutter arrangement, to wit, an upper shutter 11 and a lower shutter 12. Column 2 has at its upper part a planter trough 13 in which flowers (not shown) or other vegetation can be planted. The lower part 4 being smooth is easily rinsed down, so that rinse water, plus any entrained urine, can be conveyed, via the channel 7, to a disposal outlet.

In FIG. 2, the parts previously described are identified with the same reference numbers. As shown in this drawing, the upper and lower parts 3 and 4 of the column 2 have the form of superposed metal containers, the upper container 3 being mounted over the lower container. The border 5 surmounts a housing trough 15, made preferably in a single piece and set perpendicular to the column, and leading to an evacuation orifice 16.

The trough 15 is formed generally as a parallelepiped, with its lower surface angled slightly downward towards the evacuation orifice 16 to facilitate drainage.

The trough 15 serves as a housing for a rolling-carpet assembly consisting of the carpet 6, already mentioned, in the form of a tape or endless belt, and rollers 18 to 21 supported by a frame or chassis 22 of trapezoidal configuration formed of trapezoidal members joined by brace members. The trapezoidal shape of the chassis defines the path, in four parts, of the carpet 6: (a) an upper part inclined slightly to the horizontal and visible from the outside of the device; (b) a first oblique, descending part 23 situated practically under the column; (c) a lower part 24 parallel to the upper part; and (d) a second oblique, ascending part 25. Plates 27, 28, and 19 respectively serve as supports for the carpet in its upper part and oblique parts 23 and 25. A cylindrical cleaning brush 29 rubbing against a fixed scraper 29′ presses the carpet against the plate 28, while a drying roller 30 rubbing against a scraper 31 presses the carpet against the plate 29. The rollers 18 to 21 are slightly concave (thinner toward the center) and have end hubs to guide the carpet 6 and prevent it from sliding laterally.

The roller 18 is here configured as a drive roller and is moved by a notched belt 32 meshing with an output shaft 33 of an angular rotary transmission system 34 the latter obtaining its driving power from a prime mover electric motor and gear reduction system 35 by means of a vertically disposed shaft 36 connected to an output shaft of the latter. The assembly of parts 32 to 36 constitutes the system for driving the carpet 6, and is housed in the lower part of the column 2.

The roller 21 is disposed at an angle of the frame or chassis at one end of the larger upper base of the trapezoidal chassis, and is held under continuous tension by a system of tension springs, such as a spring 26. The latter extends parallel to the upper base of the frame. The system of springs 26 keeps the carpet 6 continually taut.

Housed in the upper container 3 are the means for supplying water, including a faucet 40 with a valve connected to a water main or service pipe (not shown), and a primary overflow trough 41 receiving the water from the faucet and pouring it into a tank 42 of greater capacity than the overflow trough 41. A float 43 follows the water level in the tank to control the opening or closing of the faucet 40.

The reservoir 48 containing water treatment agents, for example, of the disinfectant type, for treating the water in the tank 42 is placed above the tank 43 beneath the flower trough 13. A device for controlling the dosage of these agents, not shown in the drawings, permits injecting a definite predetermined quantity of the disinfecting or other agent from the reservoir 48 into the tank 42, preferably while the latter is being refilled. Such device may be, for example, a small, electrically controlled valve operating for a definite period of time, a miniature piston pump controlled by an electromagnet, or, alternatively, a piston pump controlled by a float arm. The float 43 can fulfill this purpose.

A pump 44 coupled to an electrical valve 45 serves to pump the water from the tank 42 to drive it under pressure to a first sluicing channel 46 under the cornice edge at the juncture of the upper container 3 and the lower container 4, and to a second channel 47 set opposite the oblique descending part of the carpet.

The flower trough 13 serves as a cover for the upper container, and a capillary pipe 49 passes through the bottom of the trough to dip into the primary trough 41; this pipe 49 is designed to maintain moisture in the soil in the flower trough 13.

In the device described above, the arrival and departure of an animal are detected by ultrasonic means and serve to commence the operation cycle; alternatively the present invention also comprehends that the presence of the animal can be detected by sensing a slight displacement of the horizontal surface 27 which, in this case, is suspended on the chassis to move slightly against the spring 26, and its vertical displacement is detected by an electrical contact or some other inductive or capacitive detector of proximity. In this latter case again, ultrasonics can also be used but would serve, for example, as a means of drawing in animals.

While a preferred exemplary embodiment of the invention has been described in detail hereinabove, it should be recognized that the invention is not limited to that embodiment, and that many modifications and variations thereof are possible without departure from the scope and spirit of the invention, as defined in the appended claims.

What is claimed is:

1. In a device of the type described for receiving the excretory matter of animals such as dogs, in which a rolling carpet is provided, disposed on a supporting frame therefor, upon which the animal carries out its natural excretory function, drive means are provided for rolling the carpet about the frame, means are provided for cleaning the excretory matter from the carpet, with the rolling carpet having a surface disposed in an opening in a platform for receiving the excretory matter from the animal, and a column extends upwards from the platform and contains means for controlling the rolling of the carpet about said frame; the improvement wherein said platform includes a border plate surrounding said carpet and said column, said border plate having a collector channel surrounding a foot portion of said column; and said column includes an upper part and a lower part, said lower part having smooth peripheral walls and said upper part forming a peripheral cornice extending completely around and above said lower part; with sluicing channel means being disposed under said cornice at the juncture of said upper and lower parts for distributing liquid onto said smooth walls for rinsing the same, said upper part containing means for feeding in and treating water and supplying the treated water to said sluicing channel means, and said lower part containing said drive means for rolling said carpet.

2. A device as in claim 1, wherein said means for feeding in and treating the water includes a faucet with a valve connected to a water supply and controlled by a float, a primary overflow trough for receiving water from the faucet, a tank for receiving water spilling over from said overflow trough, said flow following the level of the water in said tank, and pump means for rapidly removing the water from the tank and supplying it to said means for cleaning the excretory matter from said carpet and to said sluicing channel means.

3. A device as in claim 2, wherein said means for feeding in and treating the water includes a reservoir for a treatment agent and a dosing device for transfering an amount of said treatment agent from said reservoir to said tank in response to movement of said float.

4. A device as in claim 1, wherein said rolling carpet is supported on said frame by at least two rollers, with one of said rollers serving as a drive roller for rolling said carpet; and wherein said drive means includes a prime mover providing rotary power, a gear reduction transmission connected thereto and having an output, a rotating generally vertical shaft coupled to said output, and angular transmission disposed beneath said gear reduction transmission and having a vertical input shaft coupled to said generally vertical shaft and a horizontal output shaft; an output pulley coupled to said output shaft; and a belt linking said output pulley and said drive roller.

5. A device as in claim 2, wherein said column is formed of two superposed containers each generally in the form of a parallelepiped, with an upper one of the containers constituting said upper part and a lower one of said containers constituting said lower part of the column, with the upper container being affixed onto the lower container and including a flower trough enclosing an upper portion of the upper container, said flower trough having a capillary pipe passing through a base of the flower trough and ending in said overflow trough.

6. A device as in claim 5, wherein said lower container has one wall facing said carpet, said one wall having an opening therein adjacent said carpet; and further including a double shutter arrangement closing off said opening, said double shutter arrangement including an upper shutter hinged on the lower container and a lower shutter hinged on the upper shutter, with each said shutter opening inward to the lower container; the lower shutter being arranged to open during rotation of the carpet and the upper shutter being normally biased closed and being open only to an abnormal force from external to the column; and with said control means cooperating with an inner surface of the upper shutter for halting the carpet immediately if the upper shutter opens.

7. In a device of the type described for receiving the excretory matter of animals such as dogs, in which a rolling carpet is provided, disposed on a supporting frame therefor, upon which the animal carries out its natural excretory function, drive means are provided for rolling the carpet about the frame, means are provided for cleaning the excretory matter from the carpet, with the rolling carpet having a surface disposed in an opening in a platform for receiving the excretory matter from the animal, and a column extends upwards from the platform and contains means for controlling the rolling of the carpet about said frame; the improvement wherein said platform includes a border plate surrounding said carpet and said column, said border plate having a collector channel disposed about a foot portion of said column; and said column includes an upper part and a lower part, said lower part having at least one smooth wall and said upper part forming a peripheral cornice extending completely around and above said lower part; with sluicing channel means being disposed under said cornice at the juncture of said upper and lower parts for distributing liquid onto said smooth wall for rinsing the same, said upper part containing means for feeding in and treating water and supplying the treated water to said sluicing channel means, and said lower part containing said drive means for rolling said carpet; wherein said supporting frame for said carpet includes two trapezoidal members joined by brace members, and four rollers supported on said frame such that respective roller axes of the rollers are disposed at corners of the trapezoidal members, with the frame defining a path for the carpet divided into four parts:

an upper part inclined slightly from the horizontal;
a first, oblique descending part;
a lower part inclined slightly to the horizontal; and
a second, oblique rising part; and wherein
a cylindrical rotary cleaning brush is disposed at the oblique descending part of the carpet path, with a fixed scraper being arranged lengthwise across the cleaning brush and tangent thereto; a drying roller is disposed at the rising part of the carpet path, with a fixed scraper being disposed lengthwise against the drying roller; and wherein
said frame further includes support plates disposed within said carpet path at each of said upper, oblique descending, and oblique rising parts thereof.

8. A device as in claim 7, wherein said upper part of the carpet path corresponds to a larger base of said trapezoidal frame members.

9. A device as in claim 7, wherein said frame includes at least one tension spring member associated with one of the rollers disposed at one edge of a larger base of the trapezoidal members, and arranged parallel to said larger base, to bias said roller outward and maintain the carpet under continuous tension.

10. A device as in claim 7, wherein said device further comprises a housing disposed beneath said platform, generally in the shape of a parallelepiped and having a lower surface sloping slightly towards an evacuation orifice disposed generally below said column, said housing enclosing said carpet, said frame, said cleaning brush, said drying roller, and said scrapers.

11. A device as in claim 7, wherein said device further includes a sprayer strip disposed adjacent the descending part of the carpet path above said carpet brush, and means connecting said sprayer strip with said means for feeding in, treating, and supplying the water so that the treated water is sprayed onto the carpet during an operation cycle of the device.

12. A device as in claim 7, wherein said cylindrical rotary cleaning brush rotates against the direction of the oblique descending part of the carpet path.

13. In a device of the type described for receiving the excretory matter of animals such as dogs, in which a rolling carpet is provided, disposed on a supporting frame therefor, upon which the animal carries out its natural excretory function, drive means are provided for rolling the carpet about the frame, means are provided for cleaning the excretory matter from the carpet, with the rolling carpet having a surface disposed in an opening in a platform for receiving the excretory matter from the animal, and a column extends upwards from the platform and contains means for controlling the rolling of the carpet about said frame; the improvement wherein said platform includes a border plate surrounding said carpet and said column, said border plate having a collector channel disposed about a foot portion of said column; and said column includes an upper part and a lower part, said lower part having at least one smooth wall and said upper part forming a peripheral cornice extending completely around and above said lower part; with sluicing channel means being disposed under said cornice at the juncture of said upper and lower parts for distributing liquid onto said smooth wall for rinsing the same, said upper part containing means for feeding in and treating water and supplying the treated water to said sluicing channel means, and said lower part containing said drive means for rolling said carpet; wherein said means for feeding in and treating the water includes a faucet with a valve connected to a water supply and controlled by a float, a primary overflow trough for receiving water from the faucet, a tank for receiving water spilling over from said overflow trough, said flow following the level of the water in said tank, and pump means for rapidly removing the water from the tank and supplying it to said means for cleaning the excretory matter from said carpet and to said sluicing channel means; and wherein the upper part of said column includes a flower trough enclosing an upper portion of the upper part, said flower trough having a capillary pipe passing through a base of the flower trough and ending in said overflow trough.

14. A device as in claim 13, wherein said means for feeding in and treating the water includes a reservoir for a treatment agent and a dosing device for transfering an amount of said treatment agent from said reservoir to said tank in response to movement of said float, such that said tank contains a mixture of said water and said treatment agent, but said overflow trough contains water without said treatment agent.

15. In a device of the type described for receiving the excretory matter of animals such as dogs, in which a rolling carpet is provided, disposed on a supporting frame therefor, upon which the animal carries out its natural excretory function, drive means are provided for rolling the carpet about the frame, means are provided for cleaning the excretory matter from the carpet, with the rolling carpet having a surface disposed in an opening in a platform for receiving the excretory matter from the animal, and a column extends upwards from the platform and contains means for controlling the rolling of the carpet about said frame; the improvement wherein said platform includes a border plate surrounding said carpet and said column, said border plate having a collector channel disposed about a foot portion of said column; said column includes an upper part and a lower part, said lower part having at least one smooth wall and said upper part forming a peripheral cornice extending completely around and above said lower part; with sluicing channel means being disposed under said cornice at the juncture of said upper and lower parts for distributing liquid onto said smooth wall for rinsing the same, said upper part containing means for feeding in and treating water and supplying the treated water to said sluicing channel means, and said lower part containing said drive means for rolling said carpet; and wherein said lower part has one wall facing said carpet, said one wall having an opening therein adjacent said carpet, and has a double-shutter arrangement including an upper shutter hinged on the lower part and a lower shutter hinged on the upper shutter, with each said shutter opening inward to the lower part; the lower shutter being arranged to open during rotation of the carpet and the upper shutter being normally biased closed and being open only to an abnormal force from external to the column; and with said control means including interlock means cooperating with said upper shutter for halting the carpet immediately if the upper shutter opens.

* * * * *